(12) United States Patent
Nunez-Tejerina et al.

(10) Patent No.: US 9,047,477 B2
(45) Date of Patent: Jun. 2, 2015

(54) DISTRIBUTED KEY ENCRYPTION IN SERVERS

(75) Inventors: Fabian Nunez-Tejerina, Redmond, WA (US); Jeffrey B. Kay, Bellevue, WA (US); Robert C. Fruth, Redmond, WA (US); Naveen A. Palavalli, Bothell, WA (US); Ramesh Chinta, Sammamish, WA (US); Tolga Acar, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1160 days.

(21) Appl. No.: 12/471,474

(22) Filed: May 26, 2009

(65) Prior Publication Data

US 2010/0306554 A1 Dec. 2, 2010

(51) Int. Cl.
*H04L 9/00* (2006.01)
*G06F 21/62* (2013.01)
*H04L 9/32* (2006.01)
*H04L 29/06* (2006.01)

(52) U.S. Cl.
CPC ............ *G06F 21/6209* (2013.01); *H04L 9/006* (2013.01); *H04L 9/3263* (2013.01); *H04L 63/0823* (2013.01)

(58) Field of Classification Search
CPC .... H04L 63/0823; H04L 9/006; H04L 9/3263
USPC ........................................................ 380/277
See application file for complete search history.

(56) References Cited

U.S. PATENT DOCUMENTS

| | | | |
|---|---|---|---|
| 6,490,680 B1 | 12/2002 | Scheidt et al. | |
| 7,673,327 B1 * | 3/2010 | Polis et al. ......................... | 726/5 |
| 2003/0177401 A1* | 9/2003 | Arnold et al. .................. | 713/202 |
| 2005/0033963 A1 | 2/2005 | Ronchi et al. | |
| 2005/0246539 A1 | 11/2005 | Cofta et al. | |
| 2006/0242407 A1 | 10/2006 | Kimmel et al. | |
| 2006/0291664 A1 | 12/2006 | Suarez et al. | |
| 2008/0059799 A1 | 3/2008 | Scarlata | |
| 2009/0064297 A1* | 3/2009 | Selgas et al. ....................... | 726/6 |
| 2009/0092252 A1* | 4/2009 | Noll et al. ..................... | 380/277 |

OTHER PUBLICATIONS

Seitz, et al., "Key Management for Encrypted Data Storage in Distributed Systems", Retrieved at <<http://ieeexplore.ieee.org//stamp/stamp.jsp?tp=&arnumber=01410756>>, Proceedings of the Second IEEE International Security in Storage Workshop (SISW'03).

(Continued)

*Primary Examiner* — Andrew Georgandellis
(74) *Attorney, Agent, or Firm* — Louise Bowman; Jim Ross; Micky Minhas

(57) ABSTRACT

Architecture that stores specific passwords on behalf of users, and encrypts the passwords using encryption keys managed by a distributed key management system. The encryption keys are stored in a directory service (e.g., hierarchical) in an area that is inaccessible by selected entities (e.g., administrative users) having superior permissions such as supervisory administrators, but accessible to the account components that need to access the unencrypted passwords. The distributed key management system makes the encryption key stored in the directory service available to all hardware/software components that need the key to encrypt or decrypt the passwords.

15 Claims, 8 Drawing Sheets

(56) References Cited

OTHER PUBLICATIONS

"IBM Distributed Key Management System (DKMS)", Retrieved at <<http://www-03.ibm.com/security/products/prod_dkms.shtml>>, Mar. 24, 2009.

"The Encryption Anywhere Data Protection Platform", Retrieved at <<http://www.b19datasolutions.com/pdfs/Encryption%20Anywhere%20Technical%20White%20Paper%20-%2005%20Dec%202005.pdf>>, A Technical White Paper, Dec. 5, 2005, pp. 1-15.

"NuBridges Protect Advanced Encryption & Key Management Software", Retrieved at <<http://www.nubridges.com/solutions/encryption/>>, Mar. 24, 2009.

"Employing IBM Database Encryption Expert to meet encryption and access control requirements for the Payment Card Industry Data Security Standards (PCI DSS)", Retrieved at <<ftp://ftp.software.ibm.com/software/data/db2imstools/whitepapers/IMW14002-USEN-01.pdf>>, Dec. 2007.

* cited by examiner

US 9,047,477 B2

DISTRIBUTED KEY ENCRYPTION IN SERVERS

BACKGROUND

Data and access security is an ever-evolving challenge. User and corporate accounts of all types are threatened by entities seeking unauthorized access. Passwords or similar types of protection mechanisms are now mandatory in most situations even for simple website registrations where no financial information or other valued information is threatened.

In the context of administration, although part of a single enterprise, it is prudent that underlying organizations maintain isolation whereby data and accounts of the separate organizations can be protected from the other administrators of the other organizations.

A typical approach to providing protection to data is via the use of a single encryption key. The key is parked on each of a group of computers that need access to the data. The computers are then pointed to the encrypted data that is stored in a common location such that all computers can then access the encrypted data, decrypt the data for use, and then re-encrypt the data when leaving. However, giving the single encryption key to multiple computers introduces a weakness in the effort to protect the key since the compromise of any one of the computers can cause the whole security system to fail.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture stores specific passwords on behalf of users, and encrypts the passwords using one or more encryption keys managed by a distributed key management system. Where a single key is employed, the encryption key can be stored in a directory service (e.g., hierarchical) in an area that is accessible by only one or more high-level administrators, and inaccessible by lower-level administrators entities (e.g., users), but yet indirectly accessible to the system components that need to access external services using the unencrypted passwords. In other words, the key management system makes the encryption key stored in the directory service available to all hardware/software components that need the passwords to the external services.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
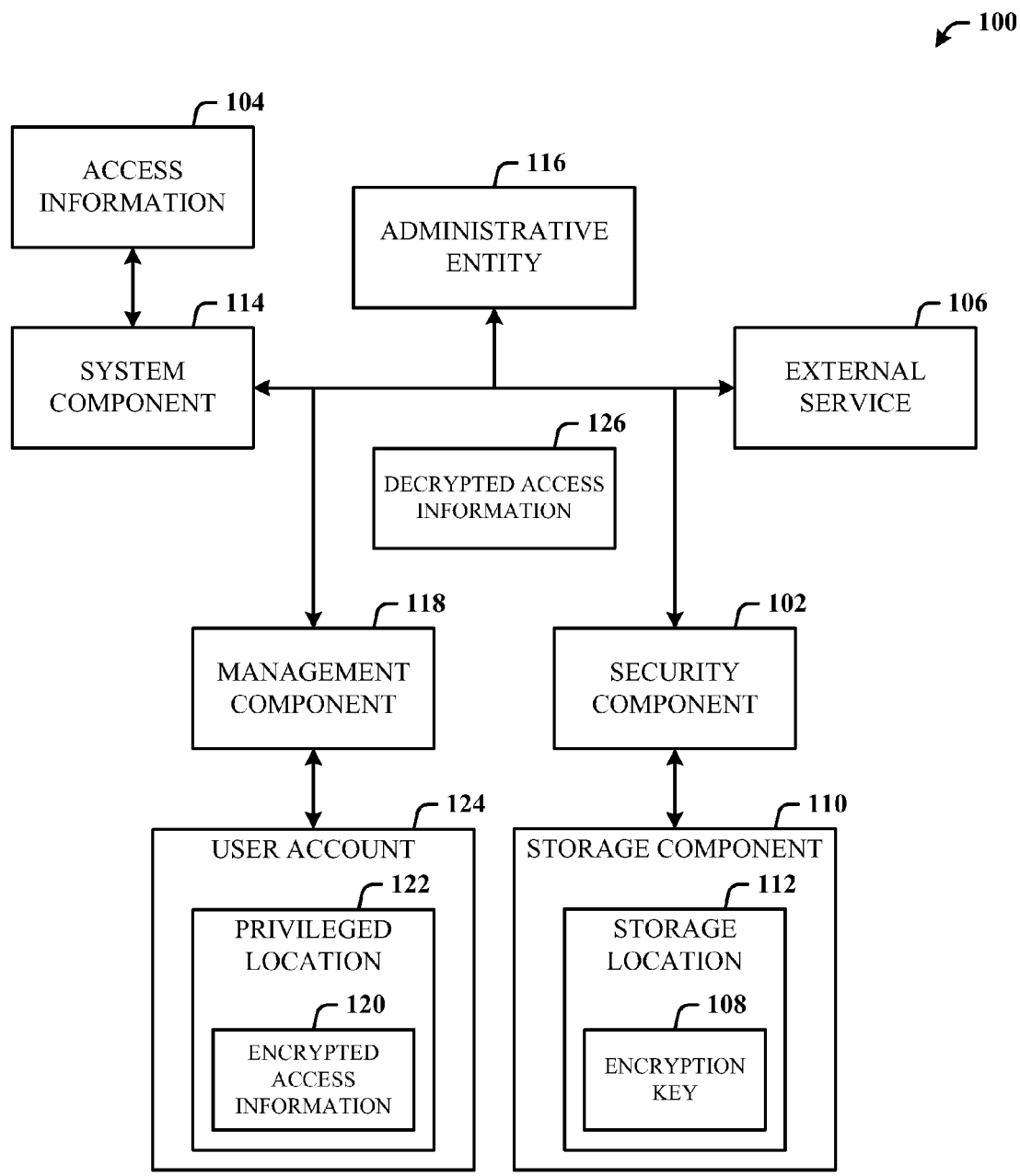
FIG. 1 illustrates computer-implemented data protection system in accordance with the disclosed architecture.

The disclosed architecture can leverage a tree structure of a directory service to store a managed encryption key in a place that is inaccessible by lower-level administrators (lower than a global administrator), but indirectly accessible to system components that need unencrypted passwords to access services (e.g., external or otherwise). The user passwords for external services are stored in encrypted form. The encrypted user passwords are stored in user accounts (e.g., user mailbox account). The encrypted passwords are accessible to the lower-level administrator given that such an administrator may need access to the user accounts; however, since encrypted, the lower-level administrator cannot access the password.

The encryption key used to encrypt and decrypt user passwords can be stored in the global settings container in the directory service, for example, which is not accessible to the lower-level administrator. Therefore, the lower-level administrator can neither view nor tamper with (other than destroy) the user's external services (e.g., email, telephony, or business service) passwords.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates computer-implemented data protection system 100 in accordance with the disclosed architecture. The system 100 includes a security component 102 for encrypting access information 104 for an external service 106 using an encryption key 108, and a storage component 110 for storing the encryption key 108 in a storage location 112 that is accessible (indirectly) to a system component 114 that utilizes the external service 106 and is inaccessible by an administrative entity 116.

The system 100 further comprises a management component 118 for storing encrypted access information 120 in a privileged location 122 of a user account 124. The encrypted access information 120 is fetched by the system component 114 and passed to the security component 102 for decryption. The security component 102 fetches the encryption key 108 from the storage component 110 in response to presentation of the encrypted access information 120 by the system component 114 to the security component 102.

The decrypted access information 126 provides access to the external service 106 by the system component 114. The administrative entity 116 can be a mid-level administrator (any administrator other than a global high-level administrator) having supervisory permissions other than for access to the encryption key 108. Note, however, that a high-level global administrator can still have total access to most, if not all, data and locations. However, the non-high-level global administrator (e.g., the administrative entity 116) such as administrators for peer organizations in the enterprise can be restricted as to access.

The access information 104 can include a user password for the user account 124 (e.g., external user email account). The password is encrypted, stored, and made inaccessible to the administrative entity 116 that has the superior permissions over the user account 124.

The encryption key 108 can be stored in a tree structure location of a shared information infrastructure (e.g., a directory service). The external service 106 can be one of a user message (e.g., email) account server, business software, or a telephony system, for example. In a more specific implementation, the access information 104 includes a password to an external email service, and the system component 114 is a mailbox aggregator that requests access to the external email service to retrieve email therefrom.

Put another way, the data protection system 100 comprises the security component for encrypting the access information 104 for the external service 106 using the encryption key 108, the management component 118 for storing the encrypted access information 120 in the privileged location 122 of the user account 124, and the storage component 110 for storing the encryption key 108 in the protected storage location 112 of a tree structure of a shared information infrastructure. The protected storage location 112 is inaccessible by the administrative entity (e.g., an administrator) having permissions other than for access to the encryption key 108.

The security component 102 fetches the encryption key 108 via the storage component 110 in response to receiving the encrypted access information 120 from the system component 114 that seeks access to the external service 106. The security component 102 fetches the encryption key 108, decrypts the encrypted access information 120, and passes the decrypted access information 126 to the requesting system component 114 for use in accessing the external service 106.

The external service 106 can be one of an email service, an external business software service, or a telephony service, and the access information 104 is requested by the system component 114, which is one of a corresponding mailbox aggregator system component, business software connector system component, or a telephony system component.

Note that although depicting multiple encryption keys at respective different protected storage locations in the storage component 110, it is to be appreciated that a single encryption key can be employed in one protected storage location such that different passwords for the different external services 208 are all encrypted and decrypted using the single encryption key. In this way, the encryption key(s) do not need to be distributed to each of the external systems 208.

Figure 2:
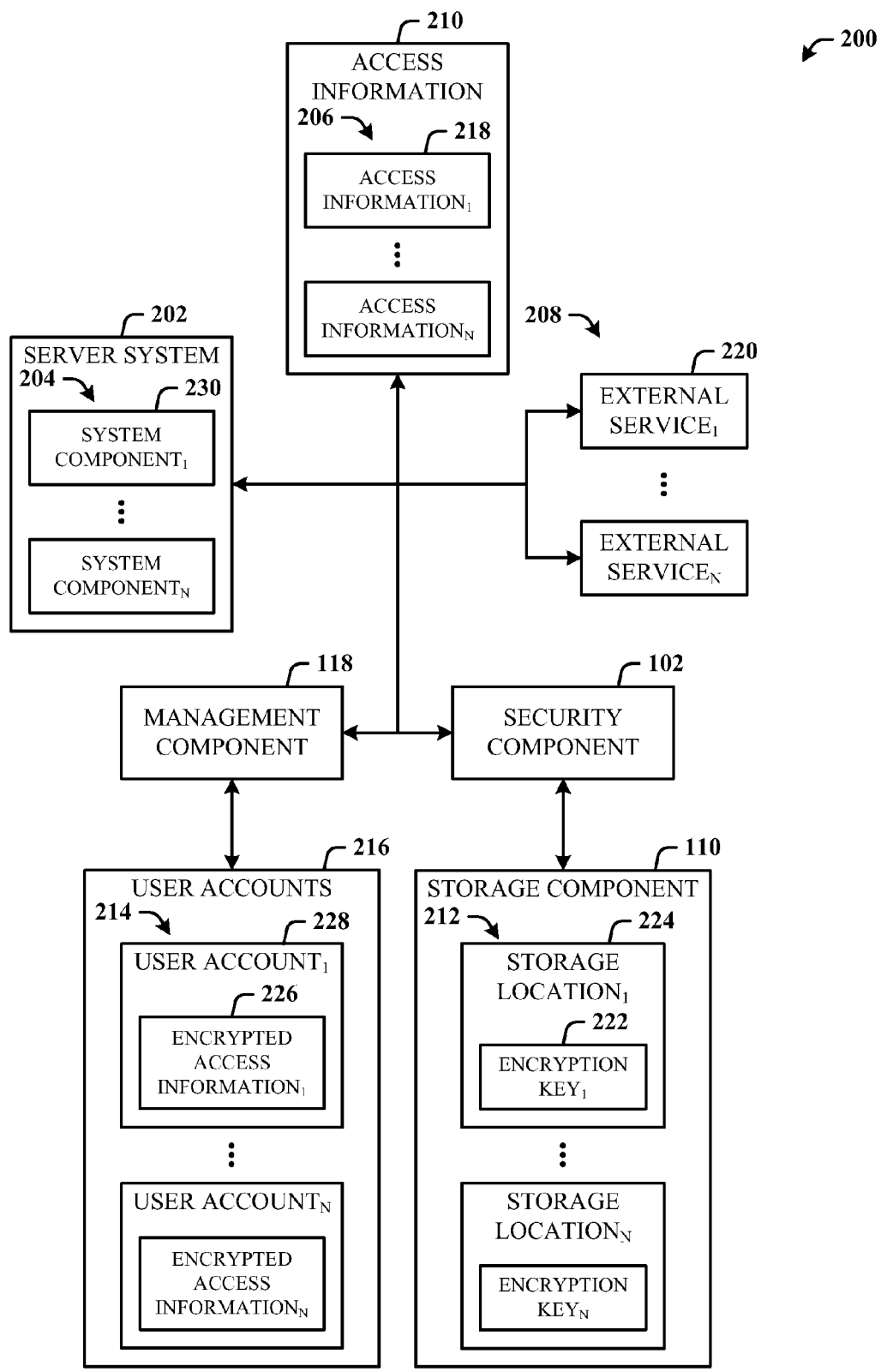
FIG. 2 illustrates an alternative embodiment of a system that employs multiple system components that need access to external services.

FIG. 2 illustrates an alternative embodiment of a system 200 that employs multiple system components that need access to external services. Here, a server system 202 (e.g., a messaging server system) includes system components 204 that use corresponding access information 206 to access further corresponding external services 208. Once input, access information 210, as can be input and processed separately, is sent to the security component 102, where different encryption keys (denoted Encryption Key$_1$, . . . , Encryption Key$_N$) are accessed from the respective storage locations 212 of the storage component 110 for encryption purposes. Note that typically, the access information/encryption process occurs at different times, when the access information is first provided. Once the access information 210 is encrypted, the encrypted access information (denoted Encrypted Access Information$_1$, . . . , Encrypted Access Information$_N$) is stored in corresponding user accounts 214 of a user accounts component 216.

In a more specific description of operation, when a user first enters access information 218 (Access Information$_1$) in the form of a password, for example, for a respective external service 220 (External Service$_1$), the password will be encrypted. The password is passed to the security component 102, which retrieves an encryption key 222 (Encryption Key$_1$) from a protected (privileged) storage location 224 of the storage component 110. The security component 102 encrypts the password using the encryption key 222, and sends the encrypted password (e.g., encrypted access information 226) to the management component 118. The management component 118 stores the encrypted password in a user account 228 that is associated with a system component 230 as well as the external service 220. The security component 102 returns the encryption key 222 to the storage location 224.

Thereafter, when the system component 230 of the server system 202 chooses to access the external service 220, the system component 230 retrieves the encrypted password (the encrypted access information 226) from the user account 228 and passes the encrypted password to the security component 102. The security component 102 retrieves the encryption key 222 from the protected (privileged) storage location 224, decrypts the encrypted password, and sends the decrypted password to the system component 230. The system component 230 then uses the password to access the external service 220 for the desired information.

The aforementioned password encryption operation and subsequent service access operations apply to the other access information 210, systems components 204, user accounts 216, and storage locations 212, as well.

The external services 208 can include a telephony system such as SMS (short message service) where VoIP (voice over Internet protocol) can be utilized via a low-end mobile device such as a cell phone or PDA (personal digital assistant). The external services 208 can also include an external business system or service such that once accessed with an unencrypted password, business information can be imported into or exported from office applications, for example. In yet another example, the external services 208 can include multiple user email accounts each of which has a separate password or other login information. An email aggregator, as one of the system components 204 of the server system 202, regularly requests access to the external email accounts in order to send and receive email information from a main aggregated email account on the server system 202.

Figure 3:
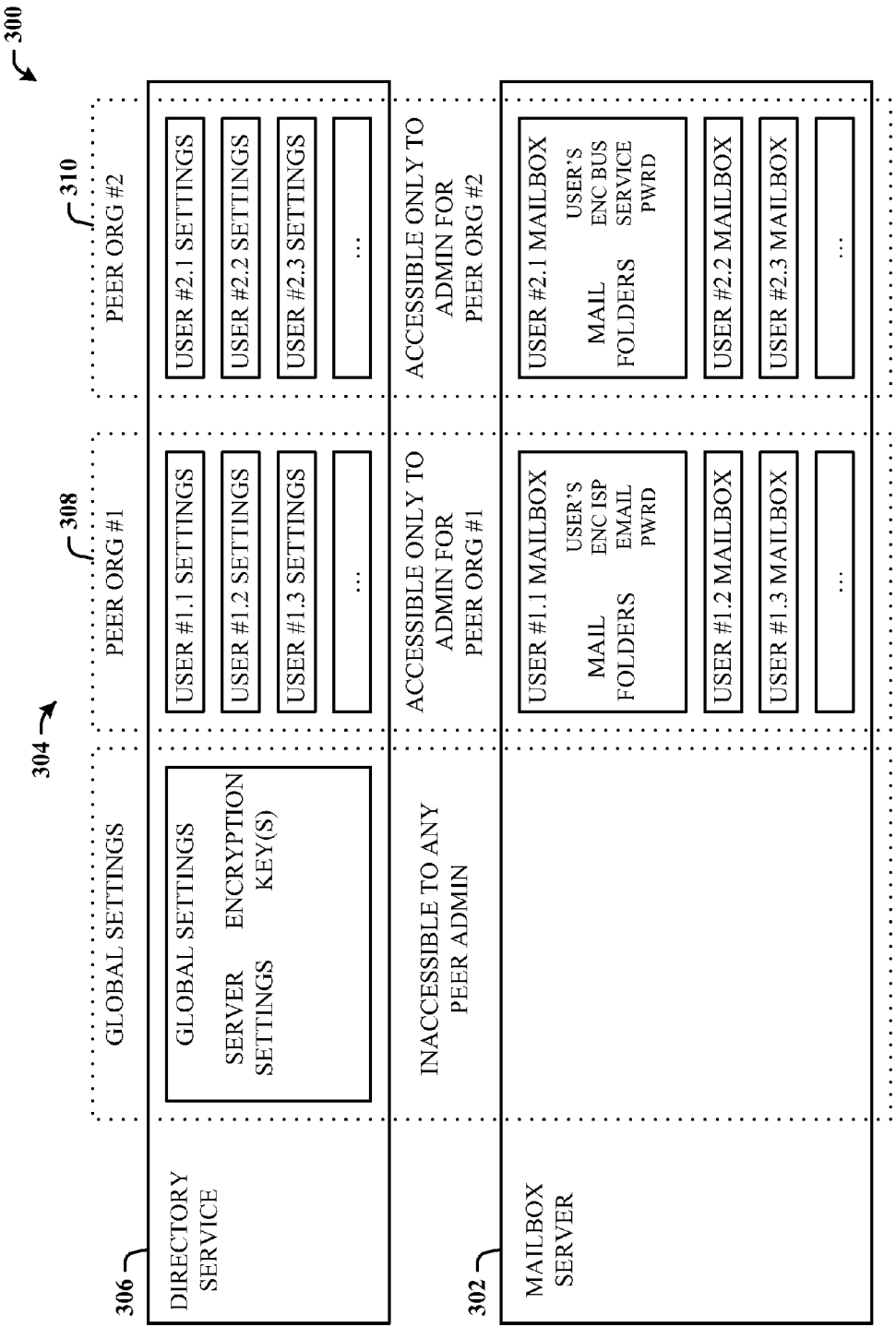
FIG. 3 illustrates a specific implementation of a system in accordance with the disclosed architecture as applied to a message mailbox server.

FIG. 3 illustrates a specific implementation of a system 300 in accordance with the disclosed architecture as applied to a message mailbox server 302. Here, peer organizations 304 are logically structured in different locations of a directory service 306 (a shared information structure) and the mailbox server 302. The mailbox server 302 includes user mailboxes (user accounts) for a first peer organization 308 and a second peer organization 310. The user mailbox for the first peer organization 308 includes mail folders and an encrypted password (access information) for an external service, such as an ISP (Internet service provider) server for email. The user mailbox for the second peer organization 310 includes mail folders and an encrypted password (access information) for an external service.

Similarly, the directory service 306 includes protected storage locations for each of the first peer organization 308 and the second peer organization 310. The storage locations include user settings for the corresponding user mailboxes on the mailbox server 302.

The peer administrator access between the organizations is isolated. In other words, the peer administrator of the first organization 308 cannot access user settings and mailboxes in the second organization 310, and the peer administrator of the second organization 310 cannot access settings and mailboxes in the first organization 308.

One or more encryption keys and server settings are stored in a global settings location of the directory service 306 such that neither of the peer administrators can access that area. However, a global or high-level administrator can still have access to all of the global settings location and the peer organization settings and mailboxes.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
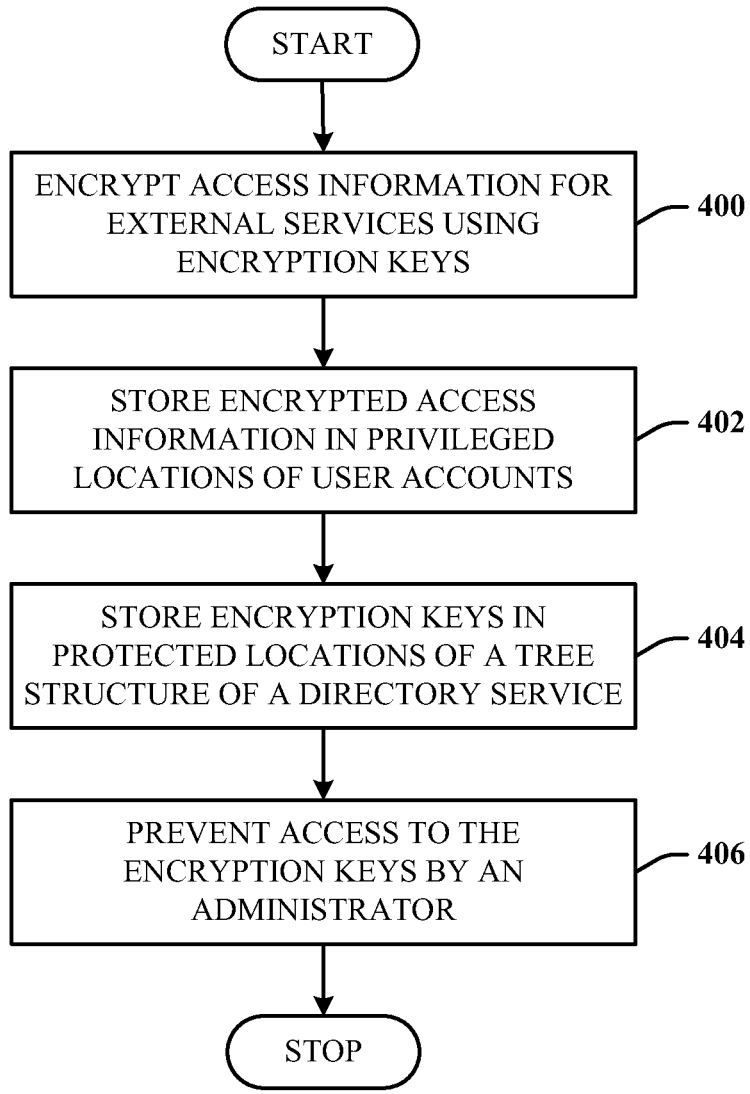
FIG. 4 illustrates a computer-implemented method of protecting data.

FIG. 4 illustrates a computer-implemented method of protecting data. At 400, access information for external services is encrypted using encryption keys. At 402, the encrypted access information is stored in privileged locations of user accounts. At 404, the encryption keys are stored in protected locations of a tree structure of a directory service. At 408, access to the encryption keys by an administrator is prevented.

The encrypted access information is accessible to the administrator; however, without the key, the administrator cannot gain access to the external services as password-protected by the user password. In one specific implementation, the access information is a password to a user email account, and an email aggregator of a messaging server requests the password for access to external email services.

Figure 5:
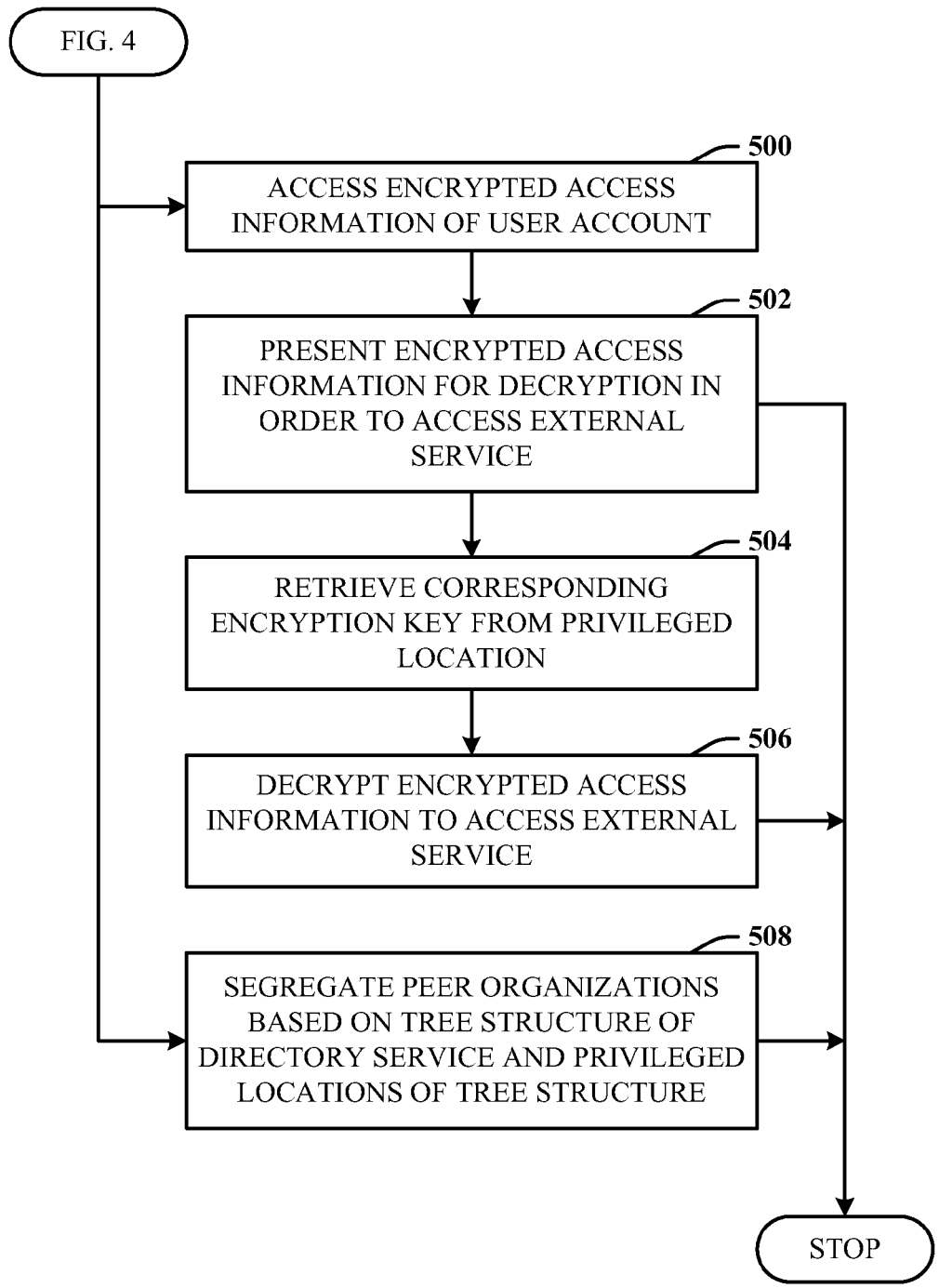
FIG. 5 illustrates additional aspects of the method of FIG. 4.

FIG. 5 illustrates additional aspects of the method of FIG. 4. At 500, encrypted access information of a user account is accessed. At 502, the encrypted access information is presented for decryption in order to access an external service. At 504, a corresponding encryption key is retrieved from a privileged location. At 506, the encrypted access information is decrypted to access the external service. At 508, peer organizations are segregated based on a tree structure of the directory service and privileged locations of the tree structure.

Figure 6:
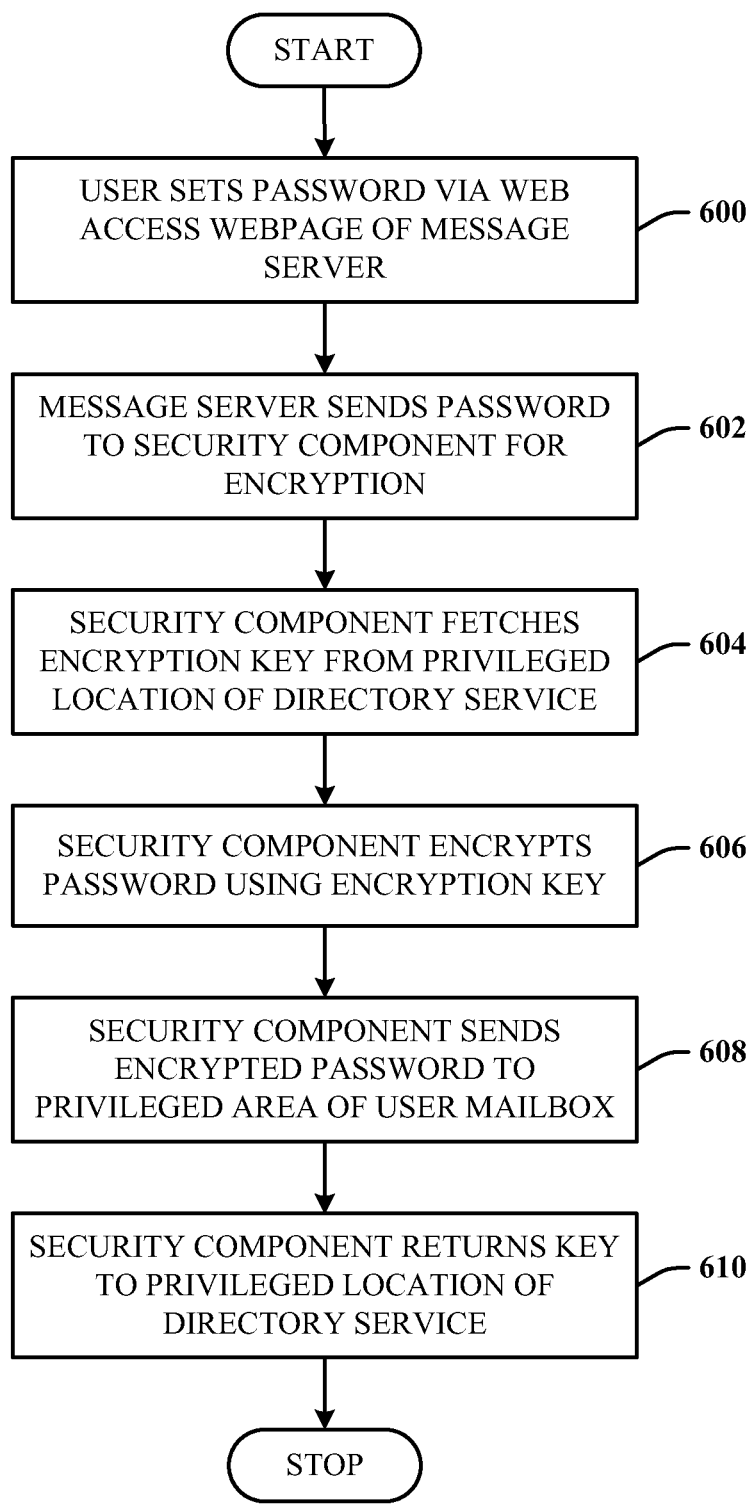
FIG. 6 illustrates a method of data protection of a message system password.

FIG. 6 illustrates a method of data protection of a message system password. At 600, a user sets a password via a web access webpage of a message server. At 602, the message server sends the password to the security component for encryption. At 604, the security component fetches an encryption key from a privileged location of a directory service. At 606, the security component encrypts the password using the encryption key. At 608, the security component sends the encrypted password to a privileged area of a user mailbox. At 610, the security component returns the key to a privileged location of the directory service.

Figure 7:
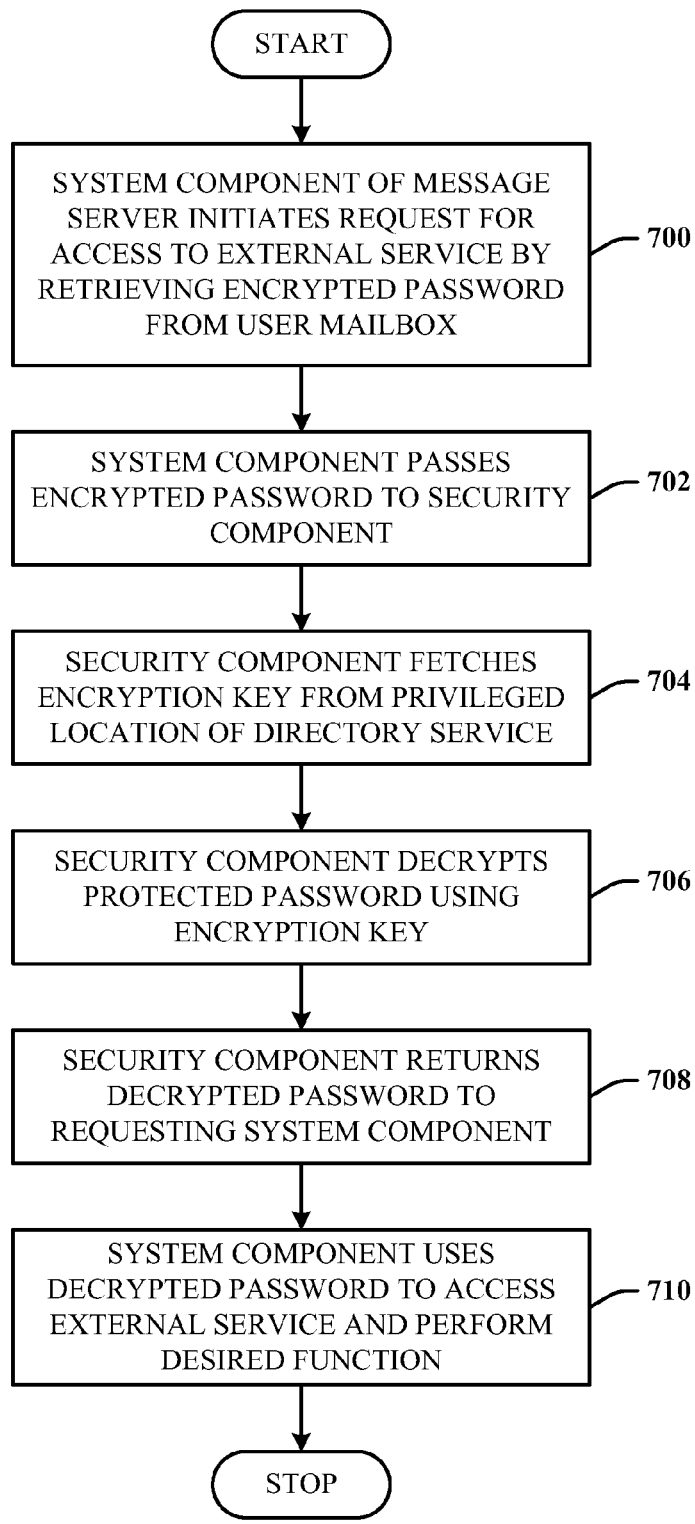
FIG. 7 illustrates a method of accessing external services from a message server.

FIG. 7 illustrates a method of accessing external services from a message server. At 700, a system component of the message server initiates a request for access to an external service by retrieving an encrypted password from a user mailbox. At 702, the system component passes the encrypted password to the security component. At 704, the security component fetches the encryption key from a privileged location of a directory service. At 706, the security component decrypts the protected password using the encryption key. At 708, the security component returns the decrypted password to requesting system component. At 710, the system component uses the decrypted password to access the external service and perform the desired function.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
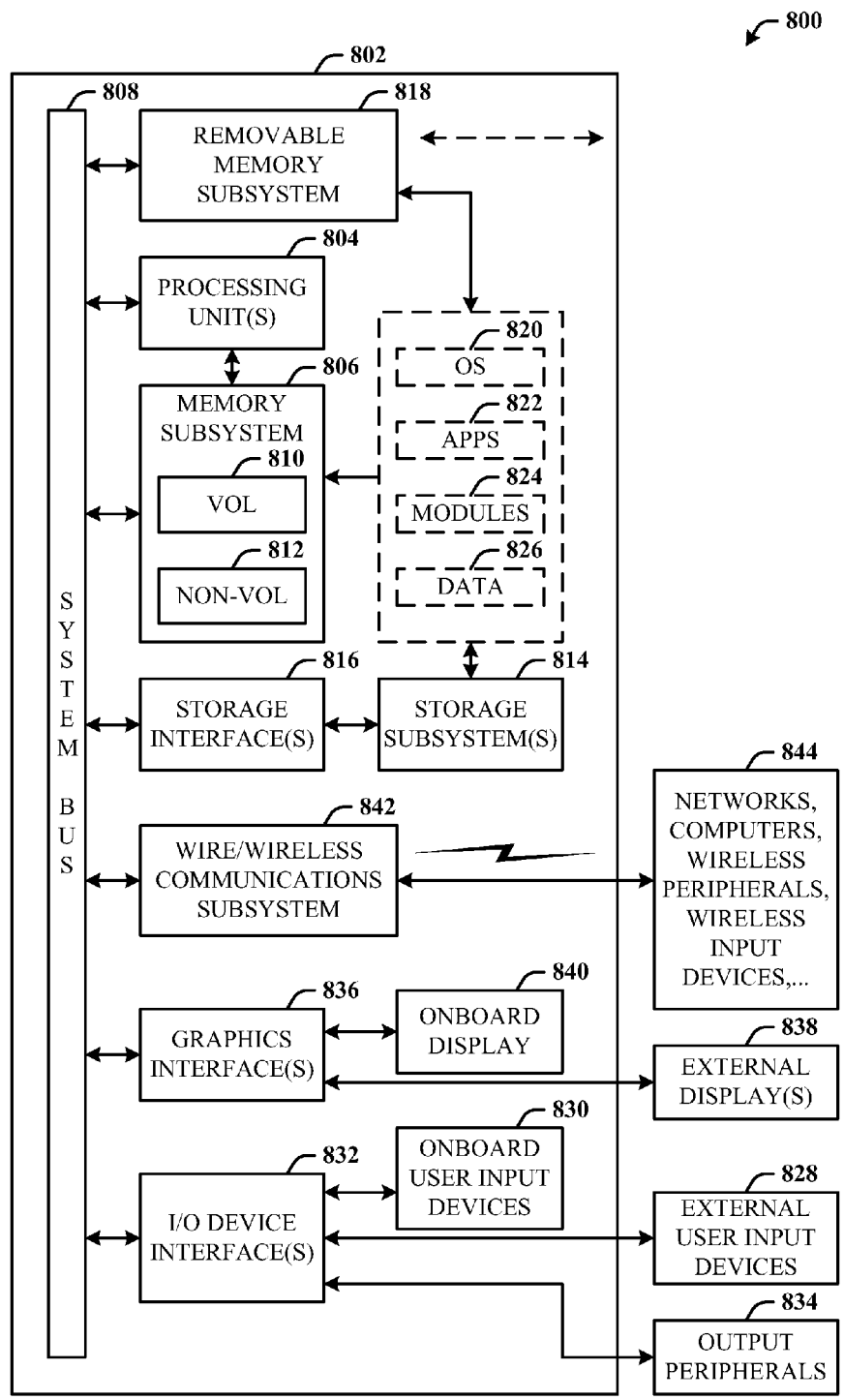
FIG. 8 illustrates a block diagram of a computing system operable to execute distributed key encryption in accordance with the disclosed architecture.

Referring now to FIG. 8, there is illustrated a block diagram of a computing system 800 operable to execute distributed key encryption in accordance with the disclosed architecture. In order to provide additional context for various aspects thereof, FIG. 8 and the following discussion are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the memory subsystem 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes storage subsystem(s) 814 and storage interface(s) 816 for interfacing the storage subsystem(s) 814 to the system bus 808 and other desired computer components. The storage subsystem(s) 814 can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

Where the computer 802 is a server machine, the one or more application programs 822, other program modules 824, and program data 826 can include the components and entities of the system 100 of FIG. 1, the components and entities of the system 200 of FIG. 2, the entities, server, and service of the system 300 of FIG. 3, and the methods and additional aspects described in the flow charts of FIGS. 4-7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Computer readable media can be any available media that can be accessed by the computer 802 and includes volatile and non-volatile media, removable and non-removable media. For the computer 802, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing device to provide data protection with distributed key management, the computing device comprising:
 a memory,
 a processor coupled to the memory, the processor executing an application in conjunction with instructions stored in the memory, wherein the application includes:
  a security component configured to:
   detect an input of access information to access an external service;
   retrieve an encryption key associated with the access information from a global settings location of a tree structure of a shared information infrastructure, wherein the encryption key corresponds to a user account associated with the access information; and
   encrypt the access information using the encryption key;
  a management component configured to:
   store the access information that is encrypted at a privileged location of the user account;
   provide a global administrator an access to the global settings location; and
   prevent a peer administrator associated with the user account an access to the global settings location;
  a storage component configured to:
   store the encryption key associated with the access information at the global settings location of the tree structure of the shared information infrastructure.

2. The computing device of claim 1, wherein the security component is further configured to:
 receive the access information that is encrypted from a system component that requests an access to the external service; and
 retrieve the encryption key that corresponds to the access information that is encrypted from the global settings location of the tree structure of the shared information infrastructure.

3. The computing device of claim 2, wherein the security component is further configured to:
 decrypt the access information that is encrypted with the encryption key; and
 provide an access to the external service using the access information that is decrypted.

4. The computing device of claim 2, wherein the system component includes a mailbox aggregator.

5. The computing device claim 1, wherein the security component is further configured to:
 detect one or more passwords associated with the user account as stored within the access information; and
 provide the global administrator an access to the access information.

6. The computing device of claim 1, wherein the security component is further configured to:
 detect one or more passwords associated with the user account as stored within the access information; and
 deny the peer administrator an access to the access information.

7. The computing device of claim 1, wherein the security component is further configured to:
 provide an access to the external service using the access information, wherein the external service includes one or more of: a user message account service, a business service, and a communication service.

8. The computing device of claim 1, wherein the security component is further configured to:
 detect the peer administrator as having a supervisory permission over the user account; and
 deny the peer administrator an access to the encryption key.

9. A system to provide data protection with distributed key management, the system comprising:
 an external server that provides an external service;
 a computing device that provides an application to manage data protection, the computing device comprising:
  a memory,
  a processor coupled to the memory, the processor executing the application in conjunction with instructions stored in the memory, wherein the application is configured to:
   store an encryption key associated with an access information that corresponds to a user account at a global settings location of a tree structure of a shared information infrastructure;
   detect an input of the access information to access an external service, wherein the access information includes one or more passwords associated with the user account;
   retrieve the encryption key associated with the access information from the global settings location of the tree structure of the shared information infrastructure, wherein the encryption key corresponds to the user account associated with the access information;
   encrypt the access information using the encryption key;
   store the access information that is encrypted at a privileged location of the user account;
   provide a global administrator an access to the global settings location; and
   prevent a peer administrator associated with the user account an access to the global settings location.

10. The system of claim 9, wherein the application is further configured to:
 receive the access information that is encrypted from a system component that requests an access to the external service, wherein the system component includes a mail aggregator; and
 retrieve the encryption key that corresponds to the access information that is encrypted from the global settings location of the tree structure of the shared information infrastructure.

11. The system of claim 10, wherein the application is further configured to:
 decrypt the access information that is encrypted using the encryption key; and transmit the access information that is decrypted to the system component to allow the system component an access to the external service.

12. A method executed on a computing device to provide data protection with distributed key management, the method comprising:
storing an encryption key associated with an access information that corresponds to a user account at a global settings location of a tree structure of a shared information infrastructure;
detecting an input of the access information to access an external service, wherein the access information includes one or more passwords associated with the user account;
retrieving the encryption key associated with the access information from the global settings location of the tree structure of the shared information infrastructure, wherein the encryption key corresponds to the user account associated with the access information;
encrypting the access information using the encryption key;
storing the access information that is encrypted in a privileged location of the user account;
providing a global administrator an access to the global settings location; and
preventing a peer administrator associated with the user account an access to the global settings location.

13. The method of claim 12, further comprising:
retrieving the access information that is encrypted from the privileged location of the user account, in response to a request to access the external service by a system component;
retrieving the encryption key from the global settings location of the tree structure of the shared information infrastructure;
decrypting the access information that is encrypted using the encryption key; and
transmitting the access information that is decrypted to allow an access to the external service.

14. The method of claim 13, wherein the system component is an email aggregator that requests the one or more passwords to receive an access to the external service.

15. The method of claim 12, further comprising:
segregating a peer organization that includes the user account and other user accounts based on the tree structure of the shared information infrastructure and the privileged location of the user account and other privileged locations of the other user accounts.

* * * * *